US008195813B2

(12) United States Patent
Gruyer et al.

(10) Patent No.: US 8,195,813 B2
(45) Date of Patent: Jun. 5, 2012

(54) HYBRID ACARS COMMUNICATION SYSTEM

(75) Inventors: Pierre Gruyer, Labarthe sur Leze (FR); David Rose, Levignac (FR); Christophe Servieres-Bordes, Saint-Lys (FR)

(73) Assignee: Airbus Operations, Toulouse (FR)

( * ) Notice: Subject to any disclaimer, the term of this patent is extended or adjusted under 35 U.S.C. 154(b) by 505 days.

(21) Appl. No.: 12/539,210

(22) Filed: Aug. 11, 2009

(65) Prior Publication Data
US 2010/0042272 A1    Feb. 18, 2010

(30) Foreign Application Priority Data
Aug. 13, 2008   (FR) ...................................... 08 55564

(51) Int. Cl.
*G06F 15/173* (2006.01)
(52) U.S. Cl. ................................ 709/228; 701/8; 701/10
(58) Field of Classification Search .................. 709/228; 701/8, 10
See application file for complete search history.

(56) References Cited

U.S. PATENT DOCUMENTS

| 2002/0007234 | A1* | 1/2002 | Heppe et al. ................. 701/10 |
| 2005/0053026 | A1* | 3/2005 | Mullan et al. ................ 370/316 |
| 2005/0286452 | A1 | 12/2005 | Hardgrave et al. |
| 2006/0080451 | A1* | 4/2006 | Eckert ........................... 709/230 |
| 2008/0090567 | A1* | 4/2008 | Gilbert .......................... 455/431 |
| 2009/0318137 | A1* | 12/2009 | Kauffman et al. ............. 455/428 |
| 2010/0033308 | A1* | 2/2010 | Muirhead ..................... 340/10.1 |

FOREIGN PATENT DOCUMENTS

| EP | 1 916 781 A1 | 4/2008 |
| EP | 2 023 685 A1 | 2/2009 |
| FR | 2 787 658 | 6/2000 |
| WO | WO 02/079918 A2 | 10/2002 |
| WO | WO 2006/026632 A1 | 3/2006 |
| WO | WO 2009/030681 A1 | 3/2009 |

* cited by examiner

*Primary Examiner* — Hussein A. Elchanti
(74) *Attorney, Agent, or Firm* — Oblon, Spivak, McClelland, Maier & Neustadt, L.L.P.

(57) ABSTRACT

The invention concerns a communication system via ACARS messages intended to be placed onboard an aircraft, said system comprising a router (310, 310') adapted to route said messages from and to a plurality of VHF, HF, SATCOM sub-networks. The system comprises a switch (360, 365) and an AoIP conversion gateway (380), the switch being connected to an HF or SATCOM transceiver module (340, 350) by means of a first two-way link (341, 351), and to said AoIP gateway by means of a second two-way link (381), the switch being adapted to select said first two-way link when it lies in a first switch position and the second two-way link when it lies in a second switch position, the switch lying in the second switch position if the aircraft is on the ground or less than a predetermined distance from the ground, otherwise it lies in the first position.

10 Claims, 5 Drawing Sheets

HYBRID ACARS COMMUNICATION SYSTEM

TECHNICAL AREA

The present invention concerns the general area of avionic telecommunications, and more particularly the area of ACARS communication systems (Aircraft Communication and Reporting System).

STATE OF THE PRIOR ART

In the area of aeronautics, the ACARS system is used to transmit data between an aircraft and a ground station, in particular to exchange information of AOC type (Aeronautical Operational Control) with operators of airline companies, and information of ATC type (Air Traffic Control) with air controllers. The data connection between onboard and the ground is generally designated by the generic term "datalink".

The ACARS system can use several types of transmission media or more exactly several types of sub-networks to transmit data namely HF, VHF or SATCOM sub-networks. In manner known per se, the VHF telecommunication sub-network allows point to point links in direct sightline, but of reduced range with ground transmitters-receivers. The SATCOM satellite sub-network provides world coverage on the other hand, with the exception of the Polar Regions, but with high communication costs. The HF sub-network allows coverage of the Polar Regions.

FIG. 1 shows an ACARS communication system 100 known in the state of the art. This generally comprises a router 110 called an ACARS router, which is in the form of a Communications Management Unit—CMU. The router 110 automatically selects the most suitable transmission medium (VHF, HF, SATCOM) in relation to a certain number of parameters (type of communication, location of the aircraft etc.). Depending on the status of these parameters, the router 110 routes the ACARS messages it receives from the avionic applications 120 towards a VHF transceiver module 130 also called VDR for (VHF Data Radio), an HF transceiver module 140 also called HFDR for HF Data Radio, or towards a SATCOM transceiver module 150. Reciprocally, the router 110 transmits the ACARS messages received from modules 130, 140, 150 towards the abovementioned avionic applications 120. The data buses 131 141 and 151 between the router 110 and the respective transceiver modules 130, 140, 150 conform to the ARINC standard 429, and the ACARS messages exchanged on these links follow the ARINC format 618.

The above-mentioned transmission media are starting to reach their limits however in terms of available access, at a time when communication needs between an aircraft and the ground are becoming increasingly greater. Additionally, the communication costs generated by ever greater volumes of data to be transmitted are a strain on airline budgets.

To remedy this situation, some players in the aeronautics sector have proposed using general public transmission media to transmit ACARS messages. Therefore if an aircraft is stationary or taxiing on the ground, or even in the approach phase, it can set up a wireless connection with the airline operations centre via the GPRS or UMTS network, a Wi-Fi terminal or a WI-Max station. The transmission of ACARS messages is made by encapsulating the messages in IP datagrams as described for example in application WO2006/026632. This transmission technique is called ACARS over IP or AoIP.

FIG. 2 illustrates an ACARS communication system 200 using an AoIP transmission technique. As previously, the system comprises an ACARS router 210 which transmits the ACARS messages received from avionic applications 220 towards VHF, HF, SATCOM transceiver modules respectively designated 230, 240, 250, and reciprocally it returns the ACARS messages received from these same modules to the transceiver modules concerned. One of the conventional transceiver modules (here the HFDR module) in FIG. 1 has been replaced by an AoIP conversion gateway 240. This gateway, via the bus 241, receives ACARS messages in ARINC format 618, encapsulates them in IP datagrams before transmitting them over a wireless link by means of a TCP/IP protocol stack. Reciprocally, it receives IP datagrams, e.g. from an air traffic control (ATC) centre or from an aeronautical operational control centre (AOC), decapsulates the ACARS messages and transmits them to the router 210.

Since the ARINC interfaces 429 of an ACARS router are all generally already linked to a conventional transmission medium, the setting up of an AoIP conversion gateway requires sacrificing a conventional medium to the benefit of transmission over IP. Alternatively, it could be envisaged to develop ACARS routers comprising a greater number of ARINC interfaces 429 to replace existing routers. However, this solution would prove to be costly in order to retrofit existing aircraft. Even if a router had an excess ARINC interface 429, for its possible connection to the AoIP gateway, the routing software would need to be modified to route messages from or to the gateway, which would necessarily require new certification for the router.

The problem at the root of the invention is therefore to propose an ACARS communication system capable of using transmission over IP whilst maintaining the possibility to transmit over all conventional transmission media without requiring replacement of the existing ACARS router.

DESCRIPTION OF THE INVENTION

The present invention is defined by a communication system via ACARS messages intended to be placed onboard an aircraft, said system comprising a router adapted to route said messages from and to a plurality of VHF, HF, SATCOM sub-networks. The communication system comprises a switch and an AoIP conversion gateway, the switch being linked to an HF or SATCOM transceiver module by means of a first two-way link, and to said AoIP gateway by means of a second two-way link, the switch being adapted to select said first two-way link when it lies in a first switch position and the second two-way link when it lies in a second switch position, the switch lying in said second switch position if the aircraft is on the ground or less than a predetermined distance away from the ground, otherwise it lies in said first switch position.

According to a first variant, the communication system comprises a sensor adapted to determine whether the weight of the aircraft is exerted on its wheels.

According to a second variant, the communication system comprises a sensor adapted to detect whether the door of the aircraft is open or closed.

According to a third variant, the communication system comprises a sensor adapted to measure the distance of the aircraft from the ground, and to compare this distance with said predetermined distance.

According to a fourth variant, the communication system comprises a sensor adapted to determine whether the aircraft engines are or are not switched off.

The first and second two-way links each advantageously consist of a pair of unidirectional buses conforming to standard ARINC 429 and of opposite directions.

According to a first embodiment of the invention, the switch is connected to said router by means of a third two-way link, the third link being connected to the first link if the switch lies in the first switch position and with the second link if the switch lies in the second switch position.

According to a second embodiment of the invention, the switch is integrated in said router, the first two-way link being connected to a first input/output interface, and the second two-way link being connected to a second input/output interface of said router, the switch selecting the first interface when it lies in the first switch position and selecting the second interface when it lies in the second switch position.

Advantageously, said transceiver module and said conversion gateway are connected to the sensor and are configured in a master-slave configuration, said gateway declaring itself as master and said transceiver module as slave to said router, if the sensor detects that the aircraft is on the ground or less than a predetermined distance from the ground, and in the opposite case said transceiver module declaring itself as master and said gateway as slave to said router.

The invention also concerns an aircraft equipped with a communication system via ACARS messages such as defined above.

BRIEF DESCRIPTION OF THE DRAWINGS

Other characteristics and advantages of the invention will become apparent on reading a preferred embodiment of the invention given with reference to the appended figures amongst which.

DETAILED DESCRIPTION OF PARTICULAR EMBODIMENTS

The invention is based on the finding that GPRS, UMTS, Wi-Fi, Wi-Max transmission media or other general public transmission media can only be used when close to the ground i.e. when an aircraft is parked or is taxiing on the ground or when it comes into the ground approach phase. Under these same circumstances, some conventional transmission media cannot be used or can only be given little use either for reasons of security (HF) or because the comparative communication cost would be much too high (SATCOM).

The idea on which the invention is based is to add a switch or to make use of an existing switch of the ACARS communication system so that one of the ARINC links 429 of the ACARS router can be switched either towards a conventional transmission medium (HF, SATCOM) or towards an AoIP conversion gateway, the position of the switch being controlled directly or indirectly by a sensor capable of detecting whether the aircraft is on the ground or close to the ground.

Figure 1:
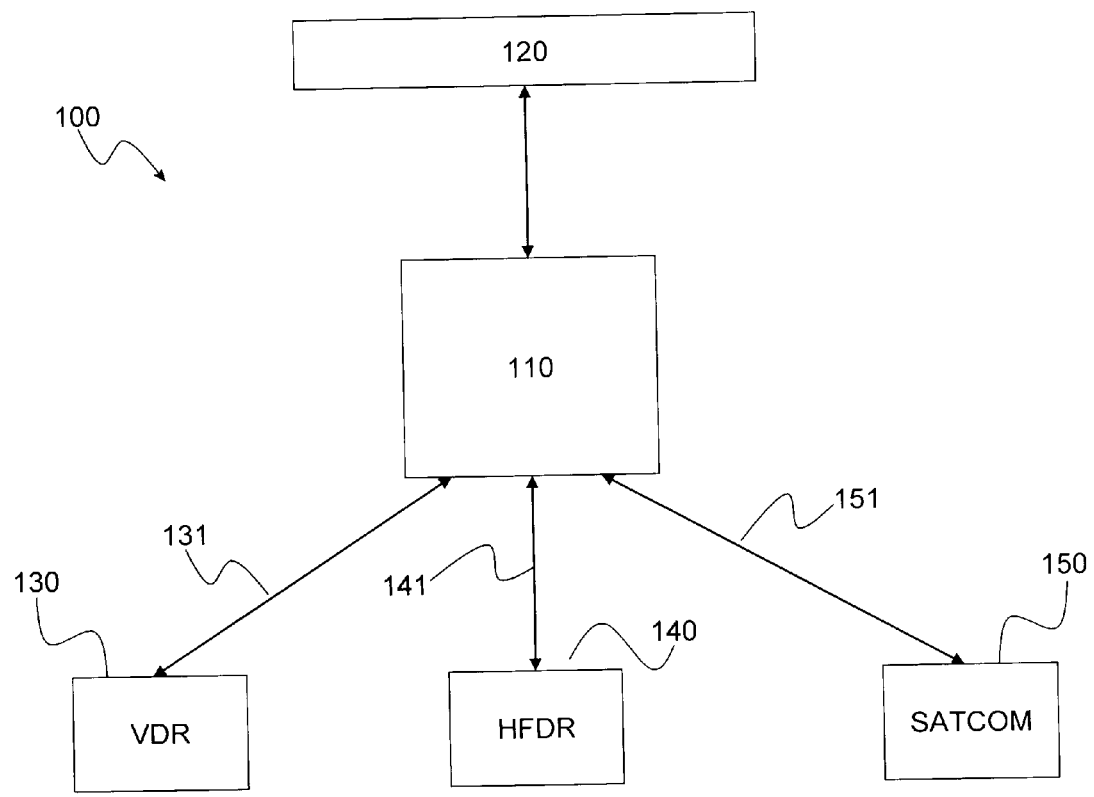
FIG. 1 schematically shows a first communication system via ACARS messages known in the prior art.
Figure 2:
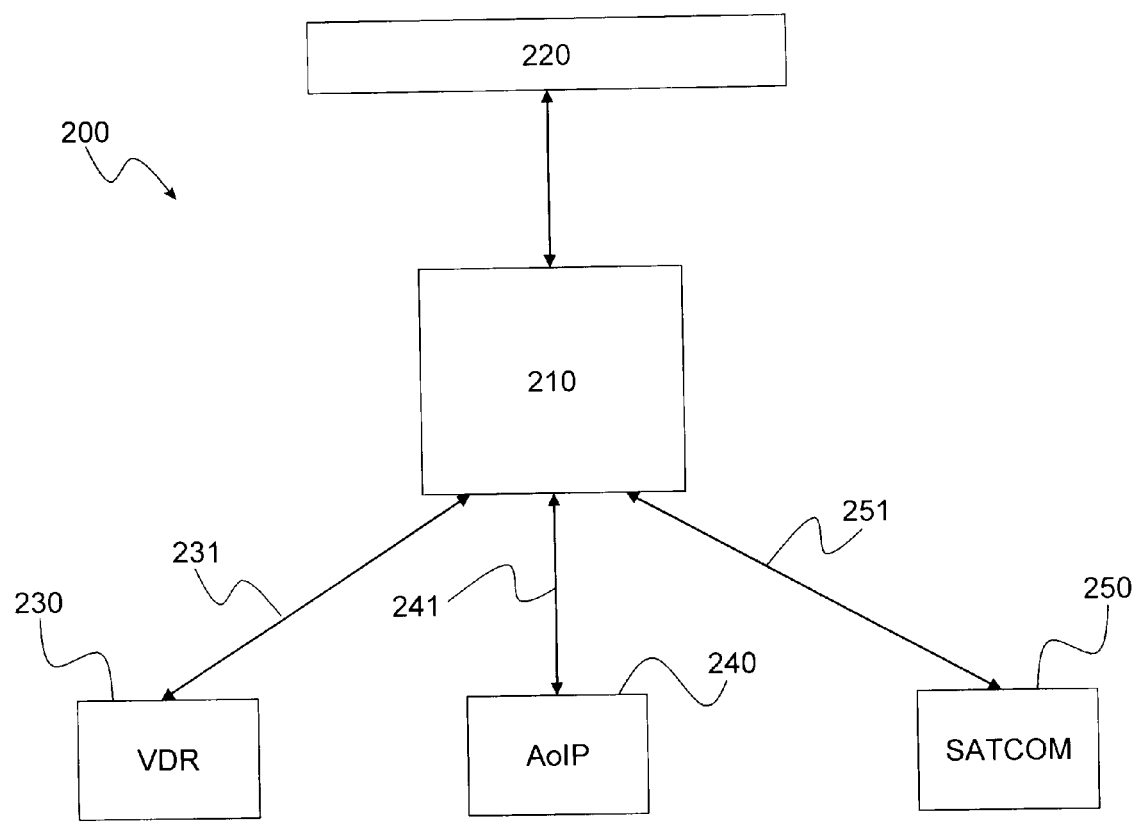
FIG. 2 schematically illustrates a second communication system via ACARS messages known in the prior art.
Figure 3A:
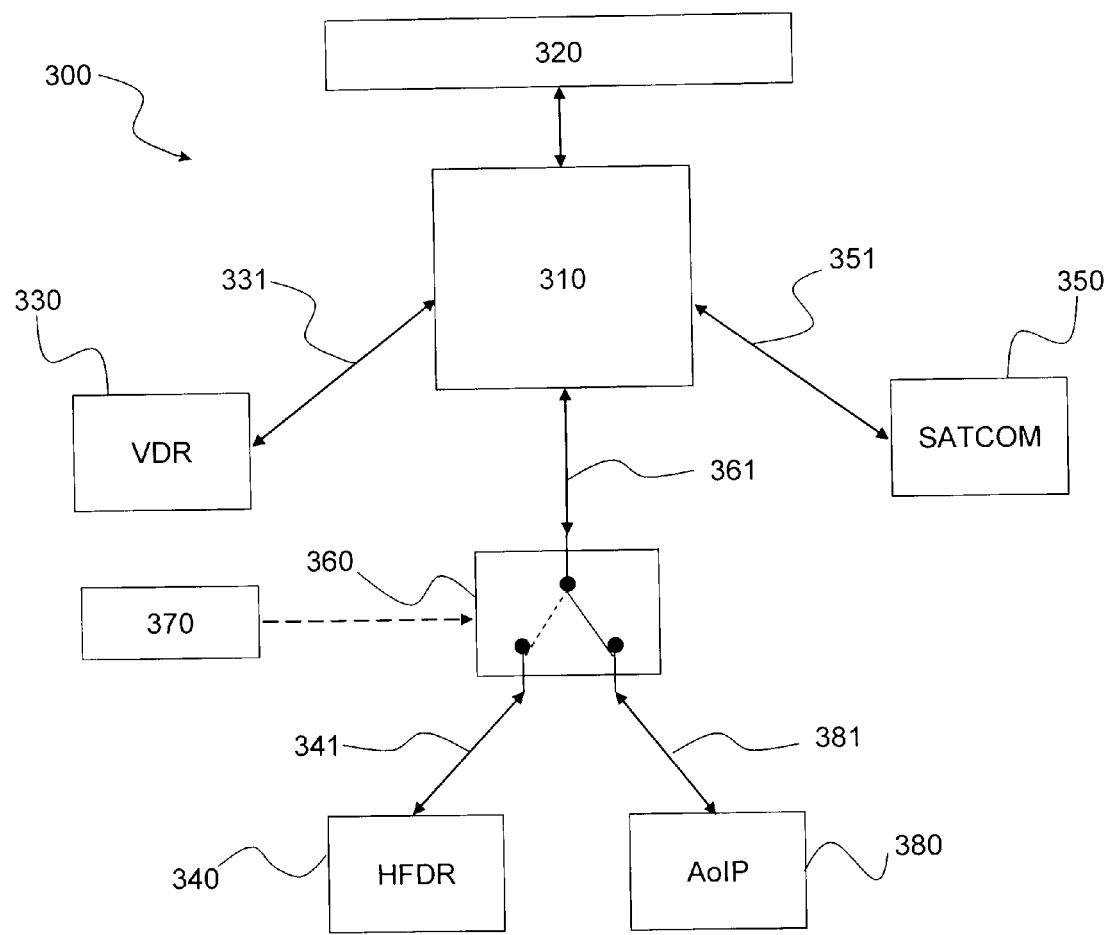
FIG. 3A schematically illustrates a communication system via ACARS messages according to a first embodiment of the invention.

FIG. 3A shows an ACARS communication system according to a first embodiment of the invention.

This communication system 300, as in the prior art, comprises an ACARS router 310 connected to a plurality of VHF, HF and SATCOM transceiver modules, respectively designated 330, 340 and 350. Additionally, in original manner, it comprises a switch 360, connected firstly to the router 310 and secondly to the transceiver module 340 as well as to an AoIP conversion gateway 380. The links between the router and the transceiver modules or conversion gateway are two-way links, obtained by means of a pair of unidirectional buses of opposite directions and conforming to standard ARINC 429. More precisely, the two-way link between the transceiver module 330 and the switch is designated 331. Similarly, the two-way link between the gateway 380 and the switch is designated 381. These two two-way links are switched on a single two-way link 361, also consisting of a pair of ARINC buses 429, connecting the switch 360 and the router 310. The AoIP gateway is itself linked to a transceiver module (not shown) using a wireless transmission medium of general public type (GPRS, UMTS, Wi-Fi, Wi-Max etc.), in a manner known per se.

Figure 4:
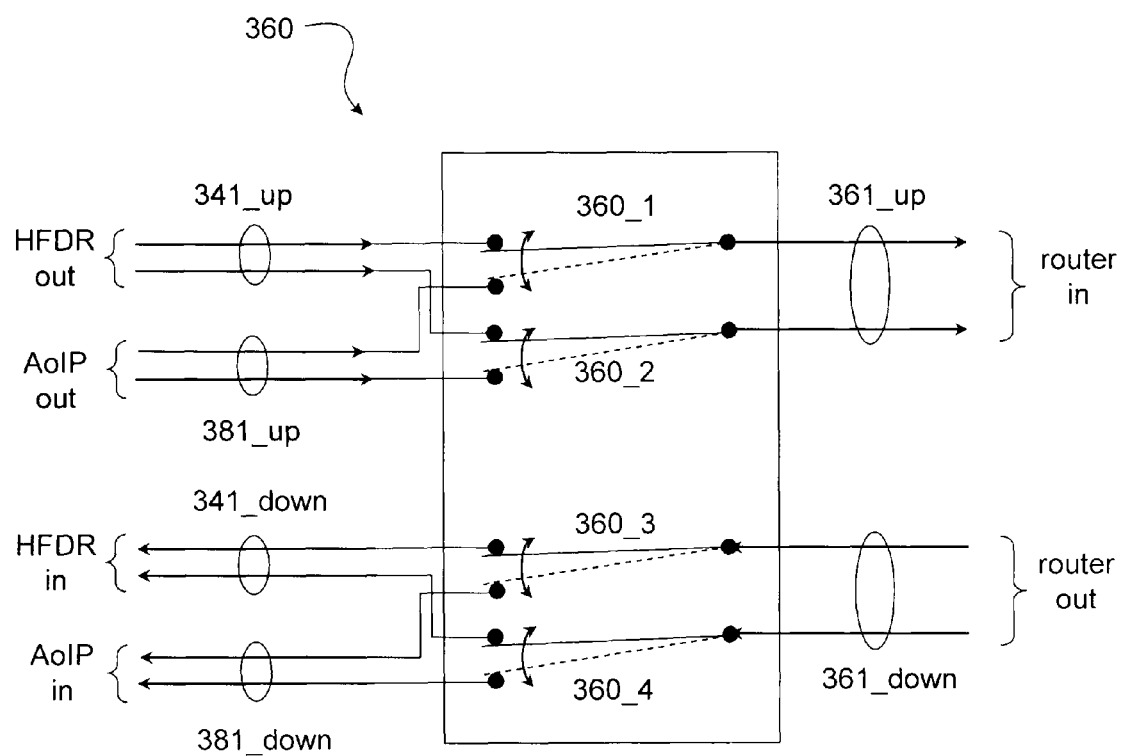
FIG. 4 schematically illustrates details of the switch in FIG. 3A.

The structure of the switch 360 is illustrated FIG. 4. The two-way link 361 consists of two unidirectional buses 361_up and 361_down, both conforming to standard ARINC 429 and respectively corresponding to the uplink and the downlink. Similarly the two-way link 341 (resp. 381) consists of two unidirectional buses 341_up (resp. 381_up) and 341_down (resp. 381_down). Each above-mentioned unidirectional bus consists of a pair of conductive wires. Switch 360 comprises four SPDT elementary switches (Single Pole Double Throw), 360_1 to 360_4, each switching one of the conductive wires. The elementary switches 360_1 and 360_2 are adapted to switch the downlink towards the input of module HF or that of gateway 380. Elementary switches 360_3 and 360_4 are adapted to switch the output of module HF or the output of gateway 380 towards the uplink. The elementary switches are controlled simultaneously and take up the same switch position (up and down). The position shown FIG. 4 by a solid line corresponds to an aircraft in flight phase.

The switch is controlled in relation to the status of the ground proximity sensor, 370. More precisely, if the sensor indicates that the aircraft is on the ground or less than a predetermined distance from the ground, the switch is in a first position linking the router 310 to the gateway 380. Conversely, if the sensor 370 indicates that the aircraft is in flight phase, the switch is in a second position linking the router 310 to the HF module 330. The switch can be controlled directly by the sensor, as illustrated FIG. 3A. Alternatively it can be controlled via a control device or other avionic equipment.

The sensor 370 can have several variants. According to a first variant, the sensor 370 is a so-called WOW sensor (Weight On Wheels) which indicates whether or not the aircraft is on the ground. This sensor is generally available on most aircraft and is part of the Landing Gear Control Interface Unit—LGCIU. According to a second variant, the sensor 370 is a telemeter capable of determining the distance of the aircraft from the ground and of comparing this distance with a predetermined height, this height being chosen to correspond to the runway approach phase. According to a third variant, the sensor detects whether the aircraft door is open, in other words whether the aircraft is on the ground and is in passenger embarking or disembarking phase. According to a fourth variant, the sensor detects whether or not all the aircraft engines are switched off. He person skilled in the art will be able to use other variants, in particular combinations of the above-mentioned sensors, without departing from the scope of the present invention.

Figure 3B:
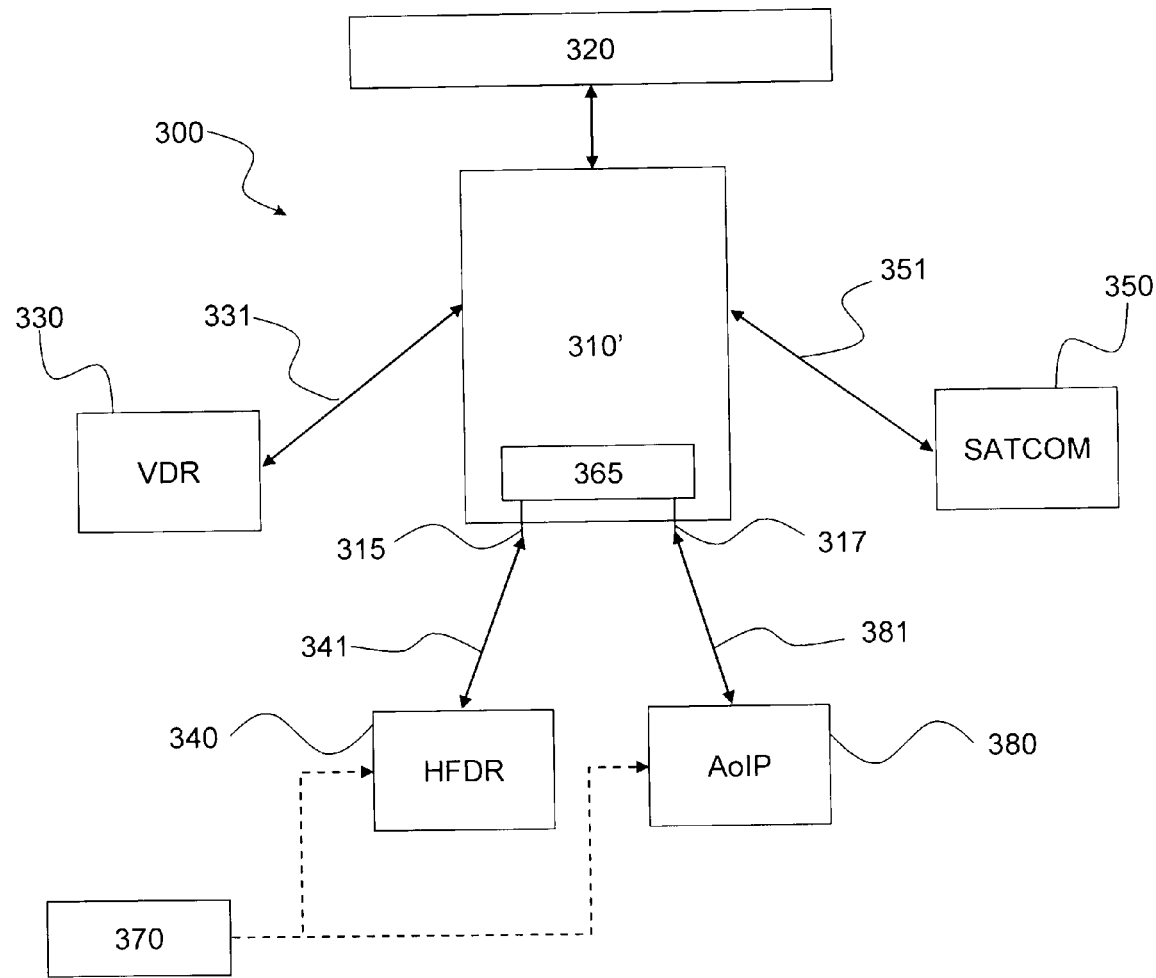
FIG. 3B schematically illustrates a communication system via ACARS messages according to a second embodiment of the invention.

FIG. 3B shows an ACARS communication system according to a second embodiment of the invention. Elements which are identical to those in the first embodiment carry identical reference numbers.

This second embodiment can be implemented when the ACARS router, here denoted 310', has an internal switch 365 allowing selection of a main HF transceiver module (or "master"), or of an auxiliary HF transceiver module (or "slave"). The router 310' has two switched inputs/outputs 315, 317 (two ARINC interfaces 429) enabling respective connection of the main and auxiliary HF transceiver modules by means of two-way links each consisting of pairs of unidirectional buses conforming to the ARINC standard 429.

If the ACARS router is equipped with said internal switch, the AoIP conversion gateway 380 is connected to a first switched input/output e.g. to 317 via a first two-way link 381, and the HF transceiver module 340 is connected to a second switched input/output e.g. to 315 via a second two-way link 341.

The HF transceiver 340 and the AoIP gateway 380 are both connected to the sensor 370 described above. If the latter signals that the aircraft is on the ground or close to the ground, the conversion gateway 380 declares itself as "master" to the router and the HF module 340 as being "slave". The router then places the internal switch 365 in a position in which the input/output 317 (connected to the gateway) is active and the input/output 315 (connected to the HF module) is disenabled. Conversely, if the sensor signals that the aircraft is in flight phase, the HF module 340 declares itself to the router as being "master" and the conversion gateway 380 as being "slave". The router then places the internal switch 365 in a switch position in which the input/output 315 (connected to the HF module) is active and the input/output 317 (connected to the gateway) is disabled.

According to one variant not shown, the HF transceiver module 340 and the AoIP conversion gateway are not controlled directly by the sensor 370 but indirectly by a control device or other avionic equipment connected to the sensor.

According to another variant, also not shown, if the router has external control means, the internal switch of the router can be controlled directly by the sensor or indirectly by a control device itself connected to this sensor.

The invention has been described for the case in which the external or internal switch switches an HF transceiver module and an AoIP conversion gateway. However, persons skilled in the art will appreciate that the invention can be implemented in similar manner if this switch switches a SATCOM transceiver module and an AoIP conversion gateway.

The invention claimed is:

1. A communication system via ACARS messages intended to be placed onboard an aircraft, said system comprising a router adapted to route said messages from and to a plurality of VHF, HF, SATCOM sub-networks, wherein the communication system comprises a switch and an AoIP conversion gateway, the switch being connected to an HF or SATCOM transceiver module by means of a first two-way link, and to said AoIP gateway by means of a second two-way link, the switch being adapted to select said first two-way link when it lies in a first switch position, and the second two-way link when it lies in a second switch position, the switch being in the second switch position if the aircraft is on the ground or less than a predetermined distance from the ground, otherwise it lies in the first switch position.

2. The communication system according to claim 1, further comprising a sensor adapted to determine whether the weight of the aircraft is on its wheels.

3. The communication system according to claim 1, further comprising a sensor adapted to detect whether the door of the aircraft is open or closed.

4. The communication system according to claim 1, further comprising a sensor adapted to measure the distance of the aircraft from the ground and of comparing this distance with said predetermined value.

5. The communication system according to claim 1, further comprising a sensor adapted to determine whether the aircraft engines are or are not switched off.

6. The communication system according to claim 1, wherein the first and second two-way links each consist of a pair of unidirectional buses conforming to standard ARINC 429 and of opposite directions.

7. The communication system according to claim 1, wherein the switch is connected to said router by means of a third two-way link, the third link being connected to the first link if the switch lies in the first switch position and to the second link if it lies in the second switch position.

8. The communication system according to claim 1, wherein the switch is integrated in said router, the first two-way link being connected to a first input/output interface and the second two-way link being connected to a second input/output interface of said router, the switch selecting the first interface when it lies in the first switch position and selecting the second interface when it lies in the second switch position.

9. The communication system according to claim 8, wherein said transceiver module and said conversion gateway are connected to the sensor and configured as master/slave, said gateway declaring itself as master and said transceiver module as slave to said router, if the sensor detects that the aircraft is on the ground or less than a predetermined distance from the ground, and said transceiver module declaring itself as master and said gateway as slave to said router in the opposite case.

10. An aircraft equipped with a a communication system via ACARS messages intended to be placed onboard an aircraft, said system comprising a router adapted to route said messages from and to a plurality of VHF, HF, SATCOM sub-networks, wherein the communication system comprises a switch and an AoIP conversion gateway, the switch being connected to an HF or SATCOM transceiver module by means of a first two-way link, and to said AoIP gateway by means of a second two-way link, the switch being adapted to select said first two-way link when it lies in a first switch position, and the second two-way link when it lies in a second switch position, the switch being in the second switch position if the aircraft is on the ground or less than a predetermined distance from the ground, otherwise it lies in the first switch position.

* * * * *